(12) United States Patent
Satomi

(10) Patent No.: US 6,879,736 B1
(45) Date of Patent: *Apr. 12, 2005

(54) APPARATUS AND METHOD OF PROCESSING CHARACTERS

(75) Inventor: Hiroshi Satomi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,721

(22) Filed: Sep. 28, 1999

(30) Foreign Application Priority Data

Sep. 29, 1998 (JP) .............................. 10-275233

(51) Int. Cl.$^7$ ............................ G06K 9/32; G06K 9/54; G06F 15/00
(52) U.S. Cl. ...................... 382/295; 382/305; 358/1.11
(58) Field of Search ................................ 382/183, 185, 382/186, 187, 189, 286, 295, 305; 358/1.11, 1.17, 1.18; 707/100, 101, 102, 5

(56) References Cited

U.S. PATENT DOCUMENTS

| | | | | |
|---|---|---|---|---|
| 5,559,934 A | * | 9/1996 | Ogura et al. | 358/1.18 |
| 5,623,612 A | * | 4/1997 | Haneda et al. | 345/856 |
| 5,983,231 A | * | 11/1999 | Minatogawa et al. | 707/102 |
| 6,041,323 A | * | 3/2000 | Kubota | 707/5 |
| 6,310,693 B1 | * | 10/2001 | Hiraike | 358/1.11 |
| 2002/0015167 A1 | * | 2/2002 | Watanabe et al. | 358/1.11 |

* cited by examiner

*Primary Examiner*—Mehrdad Dastouri
(74) *Attorney, Agent, or Firm*—Fitzpatrick, Cella, Harper & Scinto

(57) ABSTRACT

An object of the present invention is, when transferring a group of character data to an area, if there are the characters which are left since they are more than the area can receive due to the size of the area or the format, to prevent those characters from being left not arranged and to simplify the manipulation therefor. In order to attain the above object, when arranging the character data in the area which is specified in order to output the character data therefrom, any of the characters which are left since they are more than the area can receive is extracted to be stored in another area, whereby it is made possible to display only those characters in another area, an area having an empty display area contained therein, or the like. In addition, it is made possible to discriminate, every area, that there are such overflow characters.

13 Claims, 12 Drawing Sheets

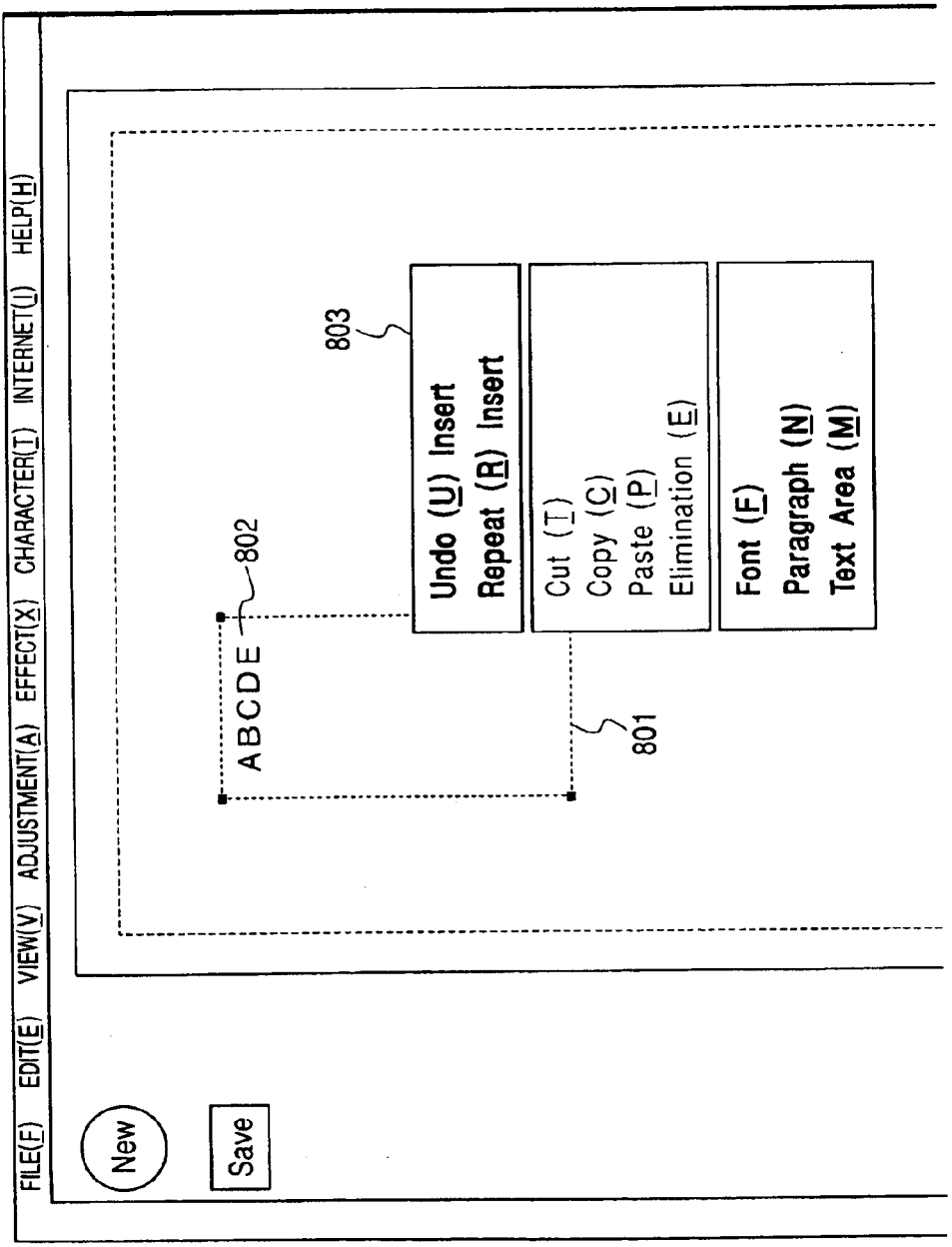

FIG. 10

(A) CHARACTER DATA INFORMATION (BEFORE CUT)

| THE NUMBER OF CHARACTER DATA (20) |
|---|
| CHARACTER CODE "A" |
| CHARACTER CODE "B" |
| CHARACTER CODE "C" |
| CHARACTER CODE "D" |
| CHARACTER CODE "E" |
| CHARACTER CODE "F" |
| CHARACTER CODE "G" |
| CHARACTER CODE "H" |
| CHARACTER CODE "I" |
| CHARACTER CODE "J" |
| CHARACTER CODE "K" |
| CHARACTER CODE "L" |
| CHARACTER CODE "M" |
| CHARACTER CODE "N" |
| CHARACTER CODE "O" |
| CHARACTER CODE "P" |
| CHARACTER CODE "Q" |
| CHARACTER CODE "R" |
| CHARACTER CODE "S" |
| CHARACTER CODE "T" |

(B) CHARACTER DATA INFORMATION (AFTER CUT)

| THE NUMBER OF CHARACTER DATA (15) |
|---|
| CHARACTER CODE "A" |
| CHARACTER CODE "B" |
| CHARACTER CODE "C" |
| CHARACTER CODE "D" |
| CHARACTER CODE "E" |
| CHARACTER CODE "F" |
| CHARACTER CODE "G" |
| CHARACTER CODE "H" |
| CHARACTER CODE "I" |
| CHARACTER CODE "J" |
| CHARACTER CODE "K" |
| CHARACTER CODE "L" |
| CHARACTER CODE "M" |
| CHARACTER CODE "N" |
| CHARACTER CODE "O" |

(C) MOVED CHARACTER INFORMATION

| THE NUMBER OF CHARACTER DATA (5) |
|---|
| CHARACTER CODE "P" |
| CHARACTER CODE "Q" |
| CHARACTER CODE "R" |
| CHARACTER CODE "S" |
| CHARACTER CODE "T" |

FIG. 12

(A) TEXT DATA INFORMATION (BEFORE PASTE)

| THE NUMBER OF TEXT DATA (5) |
|---|
| TEXT CODE "1" |
| TEXT CODE "2" |
| TEXT CODE "3" |
| TEXT CODE "4" |
| TEXT CODE "5" |

(C) MOVED TEXT INFORMATION

| THE NUMBER OF TEXT DATA (5) |
|---|
| TEXT CODE "P" |
| TEXT CODE "Q" |
| TEXT CODE "R" |
| TEXT CODE "S" |
| TEXT CODE "T" |

(B) TEXT DATA INFORMATION (AFTER PASTE)

| THE NUMBER OF TEXT DATA (10) |
|---|
| TEXT CODE "1" |
| TEXT CODE "2" |
| TEXT CODE "P" |
| TEXT CODE "Q" |
| TEXT CODE "R" |
| TEXT CODE "S" |
| TEXT CODE "T" |
| TEXT CODE "3" |
| TEXT CODE "4" |
| TEXT CODE "5" |

APPARATUS AND METHOD OF PROCESSING CHARACTERS

BACKGROUND OF THE INVENTION

1. Field of the Invention

The present invention relates to an apparatus and a method of processing characters by which characters are arranged in an area.

The present invention relates to an apparatus and a method of processing characters by which a group of characters are divided to be stored.

2. Related Background Art

In recent years, with many character processing apparatuses, not only character data contained in a document can be processed, but also image data, e.g. tables or graphics, contained therein can also be processed mixedly. The document processing apparatus of this sort is designed in such a way that before inputting the characters, the character line can be inputted to a specified rectangular area one character by one character using a keyboard, the characters, for which the range is specified, of the inputted character group can be inputted by being moved or copied, or can be transferred to that area. In addition, some of those apparatuses can carry out the control in such a way that the graphics or the like and the character data do not overlap each other.

In addition, Windows (Microsoft) or the like have come into wide use recently so that it has become possible that a plurality of documents are simultaneously edited when drawing up the documents, and also it has become possible by utilizing simultaneously various applications that a plurality of works are carried out simultaneously and in parallel.

As a result, for the character data within the area in which a plurality of character data contained in the same document is to be arranged, and for the character data contained in a plurality of documents, the copy and the movement have been able to be readily carried out.

However, when the movement, copy and transfer of the character line have become to be readily carried out either between a plurality of documents or in the single document, a large amount of character data may be transferred to the small area, which has the less number of displayable character data, in edition of the document(s) by the maloperation which an editor does not intend in some cases.

In addition, in the document processing apparatus in which the rectangular area, in which the character data is to be displayed, is previously specified, in general, the format information such as the size of the specified area and the position of arrangement of the character data can be changed after having arranged once the characters. In this connection, even when all of the character data is displayed in the area before changing the size of the area and the format attribute, by reducing the size of the area and by changing the attribute of the character size, there may occur the case where the characters any of which can not be displayed, are generated within the area.

Then, if the character data which is left since it is more than the specified area can receive, is generated, then the character data which is left since it is more than the specified area can receive, will not be displayed on the picture at all. In particular, when the characters are uniformly arranged within the area, since the character data which is left since it is more than the area can receive, is not displayed, an operator can not visually judge whether or not the character data which has overflowed from the area is present, and hence such character data is left as it is in many cases.

Then, the character data which is left as it is, while not displayed, present as the character data, which results in that the memory is unprepared wasted.

Further, even when an operator becomes aware of that the character data which is left since it is more than the specified area can receive, is present, an operator needs to carry out the work of carrying out the document edition after having changed the size of the character arrangement area in such a way that all of the character data which is left since it is more than the specified area can receive is displayed, and then restoring the size of the character arrangement area back to the original size. Therefore, the work of editing the character data is troublesome and complicated.

In addition, when the character data is read out from the text file to be successively transferred to be associated with the area, there is the case where however the area is increased, all of the character data can not be displayed since it is more than that area can receive. In such a case, the character data the amount of which is equal to or larger than the number of characters overflowing from the area needs to be deleted. In this connection, a part of the character line which is displayed within the area needs to be deleted and in addition thereto, a part of the overflow character line which becomes to be displayed as a result of that deletion needs to be deleted, and so forth. Therefore, an operator needs to carry out the very complicated work.

SUMMARY OF THE INVENTION

In the light of the foregoing, the present invention has been made in order to solve the above-mentioned problems associated with the prior art, and it is therefore an object of the present invention to provide an apparatus and a method of processing a document by which the character data which can not be arranged in an area can be readily edited by reporting the fact that there is the character data which can hot be arranged in an area to an operator, and then by moving the character data which can not be arranged in an area to another area (or another position of the same area).

In addition, it is another object of the present invention to enhance the operationability and the reliability in the edition of the characters which overflow so that they can not be outputted by carrying out the storage control or the output control with respect to the characters which overflow from the area when they are left since they are more than the area which is specified in order to output the characters can receive.

BRIEF DESCRIPTION OF THE DRAWINGS

FIG. 8 is a diagram showing a display example when no character overflows from an area, and the method of moving the overflow characters in the embodiment;

FIG. 10 is a diagram showing the change in the stored information when moving the overflow characters in the embodiment;

FIG. 12 is a diagram showing the change in the stored information when inserting the moved character data into another area in the embodiment.

DESCRIPTION OF THE PREFERRED EMBODIMENTS

The preferred embodiment of the present invention will hereinafter be described in detail with reference to the accompanying drawings.

Figure 1:
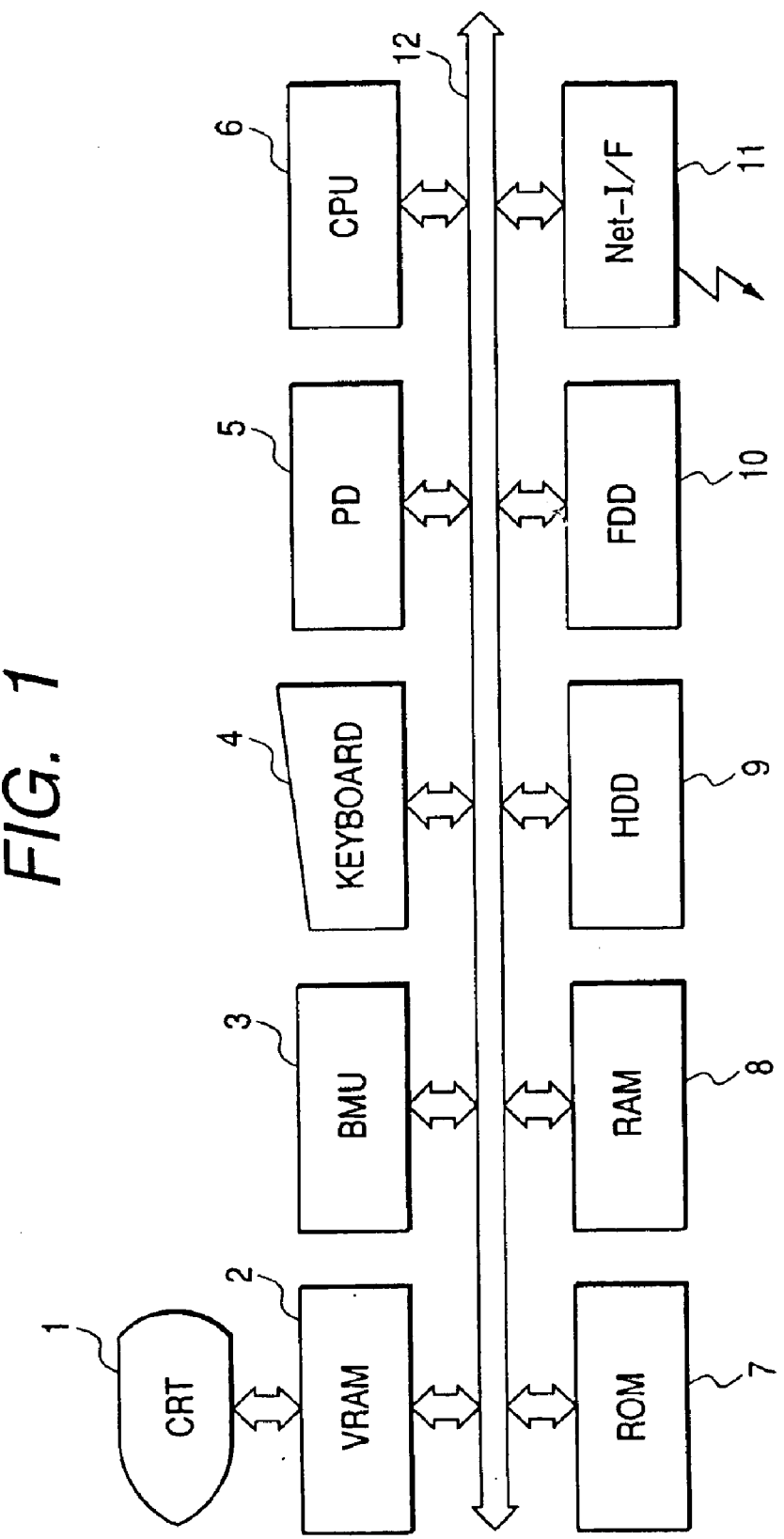
FIG. 1 is a block diagram showing a configuration of the overall apparatus according to an embodiment of the present invention.

FIG. 1 is a block diagram showing a configuration of an apparatus of processing characters according to an embodiment of the present invention.

The present apparatus includes: a display unit (CRT) 1; a video random access memory (VRAM) 2; a bit move unit (BMU) 3; a keyboard 4; a pointing device (PD) 5; a central processing unit (CPU) 6; a read only memory (ROM) 7; a RAM 8; a hard disc drive (HDD) 9; a floppy disc drive (FDD) 10; and a network interface (Net-I/F) 11. Those constituent elements are connected to one another through an input/output (I/O) bus 12 consisting of an address bus, a data bus and a control bus. In addition, the CRT 1 is connected to the VRAM 2.

The document in edition and the various message menus are displayed on the CRT 1. The VRAM 2 develops the characters and the image which are displayed on the CRT 1 and also stores therein them. The BMU 3 controls the transfer of the information between the constituent elements. The keyboard 4 includes the various keys which an operator uses when editing the document. The PD 5 is used to point out the icon or the like which is displayed on the CRT 1.

In addition, the CPU 6 controls the constituent elements on the basis of the control program which is stored in the ROM 7 and also executes the processing of controlling the character line arrangement as will be described later. The ROM 7 stores therein the program relating to the document edition, the error processing program and the program for processing the character line arrangement. The RAM 8 is used as the work area or shelter area in the error processing when the CPU 6 executes the various control programs as described above.

In addition, each of the HDD 9 and the FDD 10 preserves therein the program relating to the character line arrangement processing as will be described later, the various information and libraries. Also, the Net-I/F 11 carries out the control and the diagnosis of the network information in such a way that the present apparatus can carry out the transfer of the information between the present apparatus and other document processing apparatus through the network.

It is to be noted that the control program which is stored in the above-mentioned ROM 7 may also be stored in the storage medium such as a hard disc (HD), a floppy disc (FD) or a removable disc (RD) (all not shown) which is specially connected to the present apparatus. Also, alternatively, the control program may be stored in the
storage medium which is additionally provided in another document processing apparatus or a computer which is connected to the present apparatus through the network.

Next, the description will hereinbelow be given with respect to the information which is employed in the document editing processing in the present embodiment.

Figure 2:
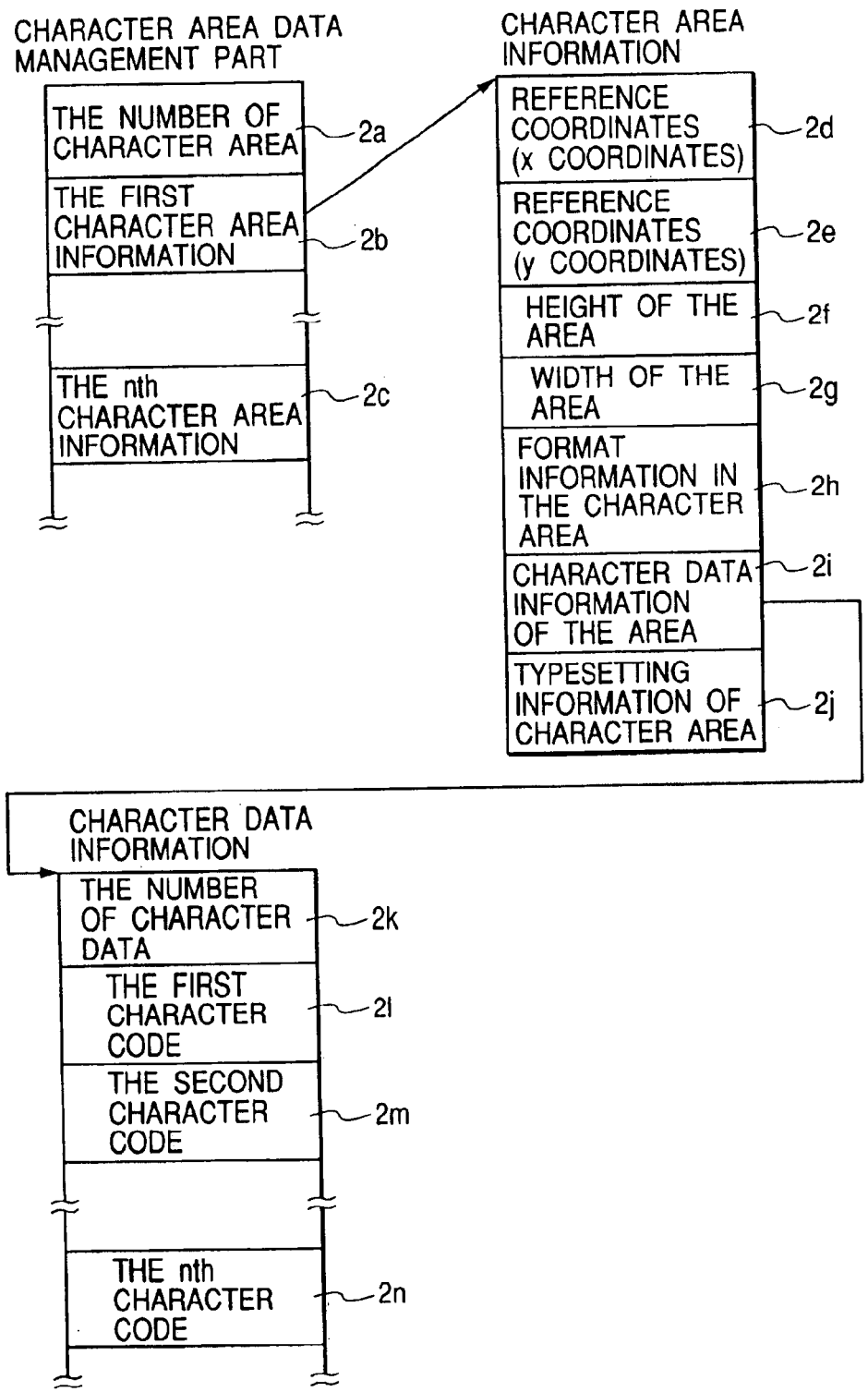
FIG. 2 is a diagram showing an example of the information which is stored in order to manage a character arrangement area.

FIG. 2 is a diagram showing the information which is stored in order to manage the character arrangement area with which the present embodiment is realized.

Now, it is assumed that each of the information shown in FIG. 2 is stored in a character area data managing unit of the HDD 9 or the FDD10.

An area 2a is the area in which the number, [num_areas], of character areas present in the document for which the edition is to be carried out, is stored; an area 2b is the area in which the information relating to the first character area of the character areas which are managed within the document, is stored; and an area 2c is the area in which the information relating to the n-th character area thereof is stored. In the areas ranging from the area 2b to the area 2c, as shown in FIG. 2, the area information of the number of the numeric value which is represented in the form of [num_area] is stored in the order of the area numbers in the character area data managing unit.

Then, the contents of the information relating to the individual character areas are written to the areas ranging from an area 2d to an area 2j.

The areas 2d and 2e are the areas in which the coordinate values as the references of the character areas are stored. In the present embodiment, each of the shapes of the character areas is rectangular and the coordinate values (pos_x, pos_y) at the vertex of the top left of the rectangular area are stored as the reference coordinates. In addition, the areas 2f and 2g are the areas in which the information relating to the shape and the size (height and width) of the character area is stored. In the present embodiment, since the character area has the rectangular shape, the height [area_height] and the width [area_width] of the area are stored in the areas 2f and 2g, respectively. In addition, the area 2h is the area in which the format information [area_info] which the character data within the character area shown in the present embodiment has is stored. The information relating to the format name, the format size, the line interval, the line pitch, the character interval and the like as the format information which is used to display the characters within the area is stored in the area 2h. The format information is inputted to be stored when a new area is set by a user, or when the update is carried out by a user.

In addition, an area 2i is the area in which the information of the character data displayed in the character area shown in the present embodiment is stored, and the contents contained therein includes: in addition to an area 2k in which the number, [total_words], of character data, to be arranged in the area is stored; an area 2l in which the first character code to be arranged is stored; an area 2m in which the second character code is stored; an are 2n in which the n-th character code is stored, and the like.

In addition, the area 2j is the area which is used in the typesetting which is used to calculate the arrangement position of the character data which is to be arranged and displayed in the present embodiment. The details of the information stored in the area 2j is shown in FIG. 3.

Figure 3:
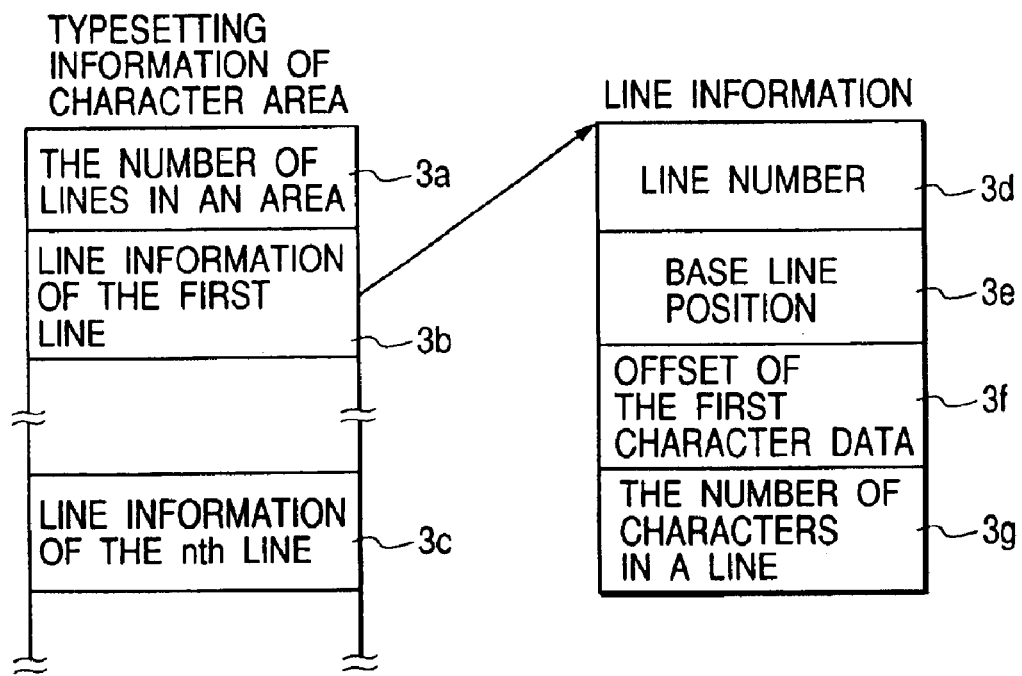
FIG. 3 is a diagram showing the typesetting information which is used to calculate the arrangement position of the character line which is arranged and displayed in and on a character editing apparatus shown in the embodiment.

FIG. 3 shows the typesetting information which is used to calculate the arrangement position of the character line which is to be arranged and displayed in the character processing apparatus shown in the present embodiment.

Now, an area 3a is the area in which the number, [num_lines], of lines which are arranged in the area is stored; an area 3b is the area in which the line information of the first line is stored; and an area. 3c is the area in which the line information of the n-th line is stored. In such a way, the line information for the number of lines which information is stored in the area 3a is stored, every line, in the areas 3b to 3c. Then, the detailed information which is contained in the respective line information is stored in areas 3d to 3g which will hereinbelow be in turn described.

The area 3d is the area in which the line number, [line_no], of the line of interest in the area having the line of interest contained therein is stored, and the area 3e is the area in which the baseline coordinate (baseline) of the line is stored. In the present embodiment, the baseline of the line corresponds to the position which is lower than the upper end, [pos_y], of the rectangular area by the character size information in the case of the first line of the area, and corresponds to the position which is lower than the baseline position of the line right before the first line, i.e., of the line the line number of which is smaller than that of the first line by one line by the line pitch in the case of not the first line. In the present embodiment, the character size information and the information of the line pitch and the like are stored as the format information in the area 2h.

In addition, an area 3f is the area in which the offset, [start_offset], which exhibits where the character code arranged in the head of the line of interest is ranked in the character data information (3i), is stored, and an area 3g is the area in which the number, [num_words], of character data which can be arranged within the line is stored. In the present embodiment, the offset is always 1 in the case of the first line within the area, and can be obtained by adding [num_words] to the offset of the line right before the first line in the case of not the first line.

Next, the method of controlling the character arrangement in the present embodiment will hereinbelow be described with reference to a flow chart.

Figure 4:
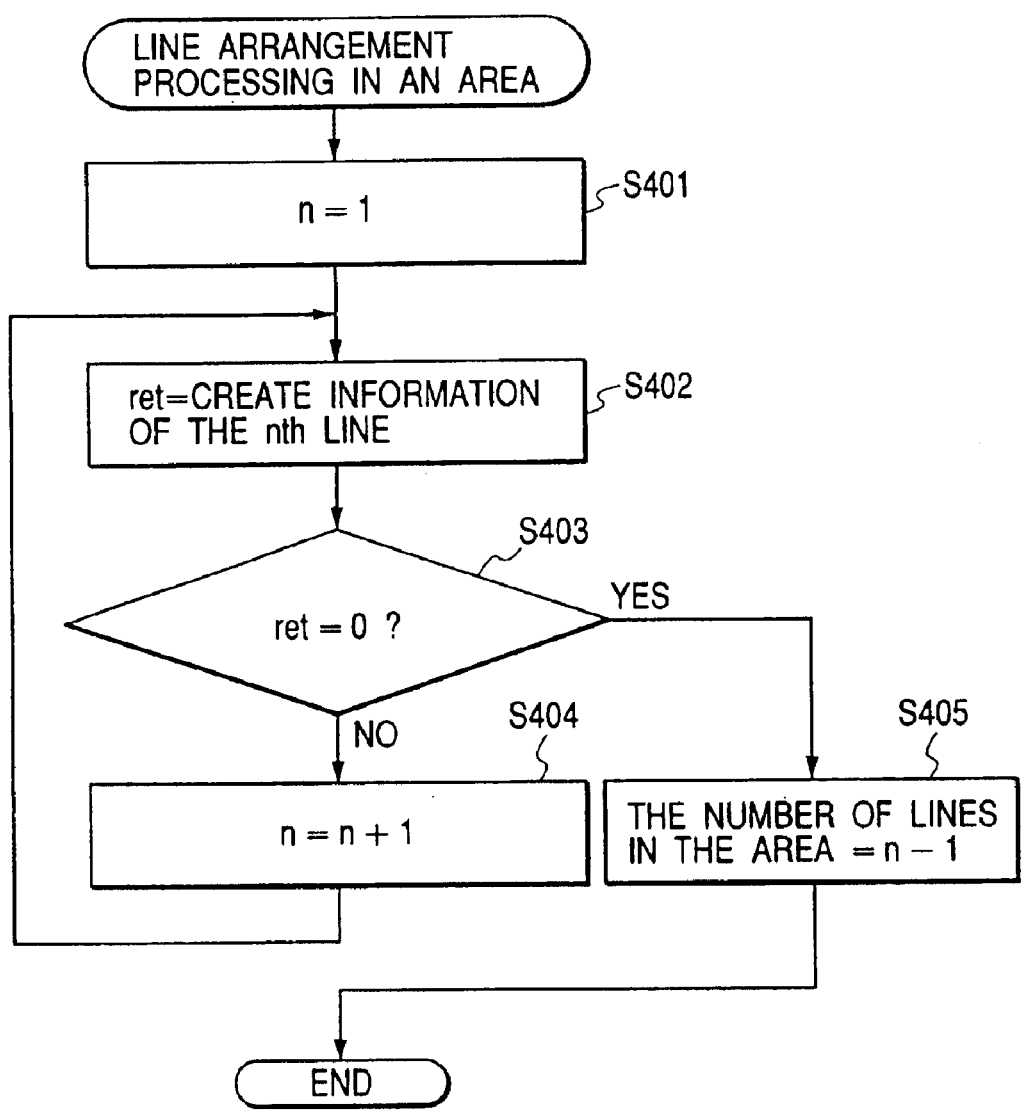
FIG. 4 is a flow chart useful in explaining the line arrangement processing in an area in the embodiment.

FIG. 4 is a flow chart useful in explaining the line arrangement processing in the area in the present embodiment.

First of all, in Step S401, the work variable n which is used to count the number of lines is initialized to 1. Next, in Step S402, the line information of the n-th line in the area is created. The line information thus created is stored in the area 3c of the line information. The details of the created information is the information stored in the areas 3d to 3g shown in FIG. 3. While the details of the processing of creating the line information which is executed in Step S402 will be specially described later with reference to a flow chart shown in FIG. 5, when the arrangement of the line can not be carried out in this processing, zero is set to the arrangement judgement variable (ret) of the line (Step S509).

Then, in Step S403, it is judged whether or not the arrangement judgement variable (ret) of the line is zero.

Since if it is judged in Step S403 that ret=0 is not established, then this means that the arrangement of the line has been carried out, n is incremented in Step S404 and then the processing is returned back to Step S402 in which the line information of the next line is created in turn.

On the other hand, since if it is judged in Step S403 that ret=0 is established, no more line can be arranged in the area, in Step S405, in order to store the information relating to up to which line the arrangement has been completed, (n−1) is set to the number, [num_lines], of lines in the area to complete the processing. The number, [num_lines], of lines in that area is stored in the area 3a.

Figure 5:
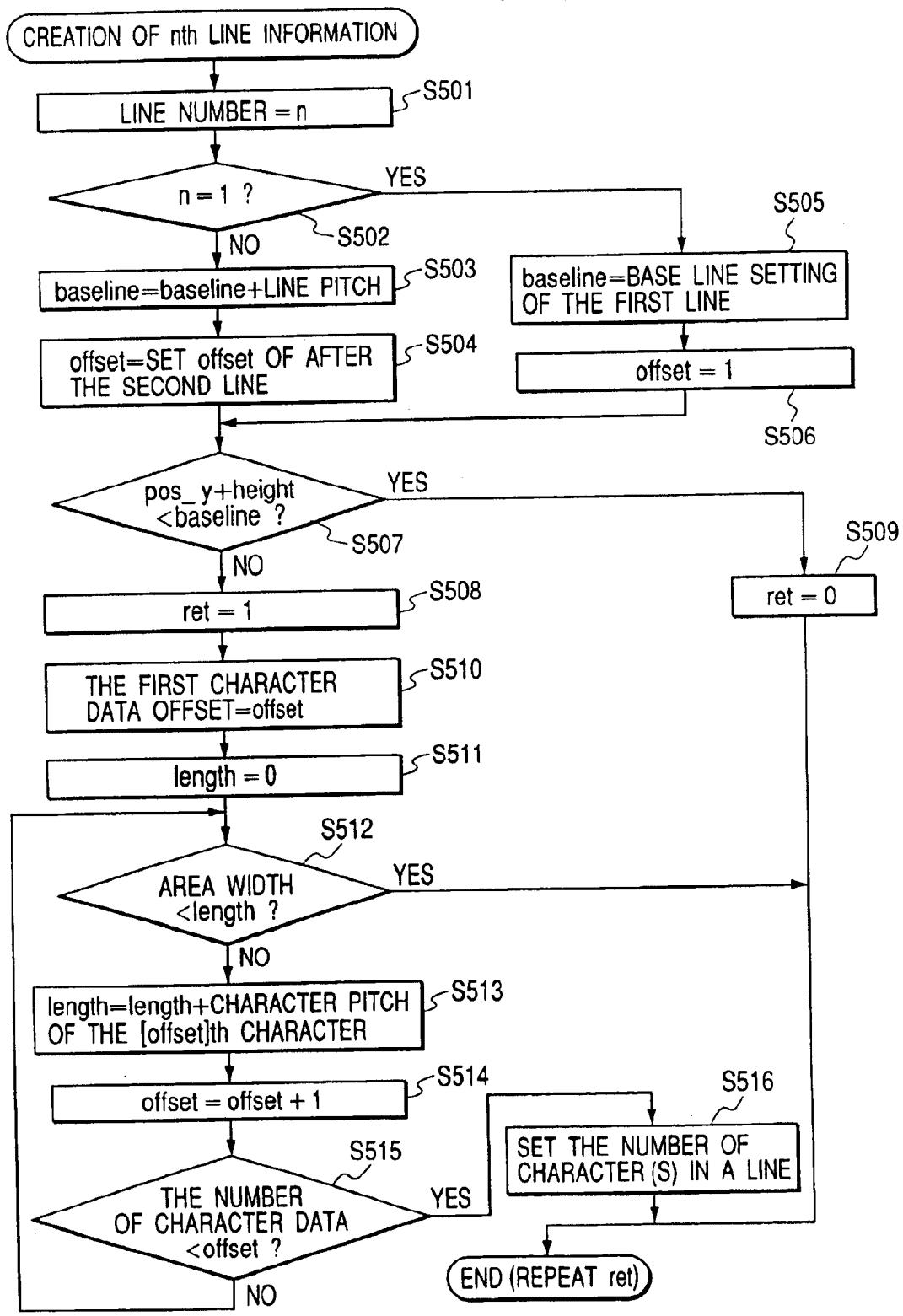
FIG. 5 is a flow chart useful in explaining the processing of creating line information of the n-th line in the embodiment.

The flow chart of FIG. 5 exhibits the processing of creating the line information of the n-th line in the present embodiment.

First of all, in Step S501, the line number n of the line which will be created from now on is set in the storage area 3d of the line number. This value n is the value which was set in Step S401 or S404. Next, in Step S502, it is judged whether or not n=1 is established.

Since if it is judged in Step S502 that n=1 is established, then the line information to be created is the line information of the first line within the area, in this case, in Step S505, the setting of the baseline position of the first line is carried out. The baseline of the first line corresponds to the position which is lower than the upper end of the rectangular area by the character size of the character to be arranged. That is, the following relation is obtained.

$$\text{baseline} = \text{pos\_y} * \text{character size to be arranged} \quad (1)$$

In this connection, the character size of the character to be arranged is acquired from the format information which is stored in the area 2h. Then, in Step S506, 1 is set to the work variable (offset) exhibiting the character position.

On the other hand, since if it is judged in Step S502 that n=1 is not established, the line information to be created is not the first line within the area, in this case, in Step S503, the baseline of the line is set on the basis of the following expression:

$$\text{baseline} = \text{baseline} + \text{line pitch} \quad (2)$$

In addition, the work variable offset exhibiting the character position is, from the first offset, [start_offset], of the line right before the first line and the number, [num_words], of character data in the line of the line right before the first line, obtained on the basis of the following expression:

$$\text{offset} = \text{start\_offset} + \text{num\_words} \quad (3)$$

Next, in Step S507, it is judged whether or not; the line can be arranged in the area. In this connection, that judgement is carried out on the basis of whether or not the baseline which has been calculated in Step S503 or Step S505 is above with respect to the lower end of the area, i.e., the judgement of whether or not the line of interest is contained within the area.

The lower end of the area corresponds to the position which is obtained by adding the height (height) of the rectangular area to the y coordinate value (posy) of the reference point. Therefore, since when the following relation is established;

$$\text{pos\_y} + \text{height} < \text{baseline} \quad (4)$$

it was judged that the line could not go into the area, thereby being determined that the line of interest can not be arranged.

If it is judged in Step S507 that the line of interest can not be arranged, in Step S509, zero is substituted for the arrangement judgement variable, [ret], of the line to complete the processing.

On the other hand, if it is judged in Step S507 that the line of interest can be arranged, then in Step S508, 1 is substituted for the arrangement judgement variable, [ret], of the line of interest. Thereafter, in Step S510, the numeric value of [offset] is substituted for the first character data offset of the line of interest. Then, the first character data offset of the line of interest is stored in the area 3f.

Next, in Step S511, the work variable [length] exhibiting the length which is occupied by the character line arranged in the line is initialized with zero. Then, in Step S512, it is judged whether or not the width, [width], of the area exceeds the work variable [length].

If it is judged in Step S512 that the width, [width], of the area exceeds [length], then in Step S513, the [offset]-th character is arranged. At this time, the character width of the [offset]-th character data is added to [length]. In Step S514, the value of [offset] is incremented, and then in Step S515, it is, judged whether or not there is the next character. If it is judged in Step S515 that there is no next character, then in Step S515, the following expression is judged to be established, $$\text{the number of character data} < \text{offset} \quad (5)$$

and hence in this case, in Step S516, the number of characters in the line is set and the processing completes. In this connection, the number, [num_words], of characters in the line can be obtained on the basis of the following expression:

$$\text{num\_words} = \text{offset} - \text{start\_offset} - 1 \quad (6)$$

and is stored in the area 3g.

On the other hand, if it is judged in Step S515 that there is the next character, then the processing is returned back to the judgement in Step S512 to judge whether or not there is an area in which the character is to be arranged in the line.

In this connection, if it is judged in Step S512 that [length] exceeds the width, [width], of the area, i.e., if the [offset]-th character is arranged in the line, then the character overflows in the line of interest, then in Step S516, the number of characters in the line is set to complete the processing. At this time, the number of characters in the line can be obtained on the basis of the above expression (6).

In a manner as described above, the character arrangement in the present embodiment and the setting of the typesetting information resulting therefrom can be carried out.

Next, the description will hereinbelow be given with respect to the method of judging the overflow characters in the present embodiment with reference to a flow chart shown in FIG. 6.

Figure 6:
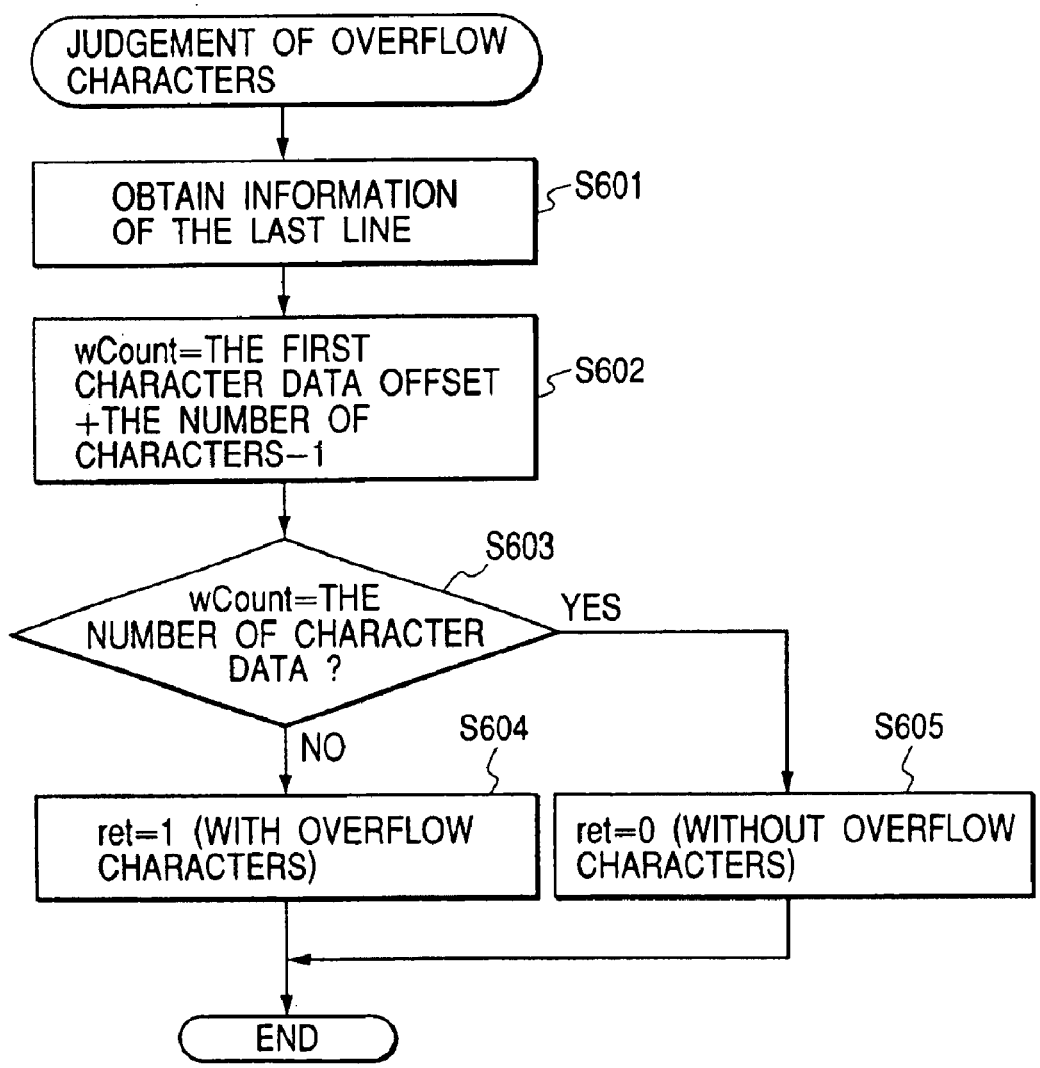
FIG. 6 is a flow chart useful in explaining the method of judging the overflow characters in the embodiment.

FIG. 6 is a flow chart useful in explaining the processing of judging whether or not there is the overflow characters in the present embodiment.

First of all, in Step S601, the line information of the final line (the lowest line) which is arranged in the area of interest is acquired on the basis of the typesetting information. The line information of the final line is stored in the area 3c of the line information (n=num_lines) on the basis of the number, [num_lines], of lines in the area 3a. Next, in Step S602, the final character data of the final line is obtained. The offset of the final character data of the final line can be obtained from the following expression on the basis of the first character data offset, [start_offset], of the final line which is stored in the area 3f, and the number, [num_words], of the characters in the line of the final line which is stored in the area 3g.

$$\text{wCount} = \text{start\_offset} + \text{num\_words} - 1 \quad (7)$$

Next, in Step S603, it is judged whether or not [wCount] which has been obtained in Step S602 is equal to the total number, [total_words], of character data in the area.

If it is judged in Step S603 that [wCount] which has been obtained in Step S602 is not equal to the total number, [total_words], of character data in the area, this means that the character data to be arranged is still present after the final character which is arranged, i.e., there is the overflow characters. In this case, in Step S604, 1 is set to the arrangement judgement variable (ret).

On the other hand, if it is judged in Step S603 that [wCount] which has been obtained in Step S602 is equal to the total number, [total_words], of character data in the area, this means that up to the final character is arranged, and hence it is judged that there is no overflow character. In this case, in Step S605, zero is set to the variable (ret).

In a manner as described above, it is possible to judge whether or not there is the overflow characters when arranging the characters in the area. This processing is executed after completion of the line arrangement processing in the area in FIG. 4.

Figure 7A:
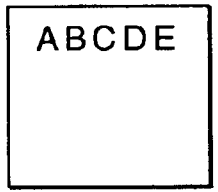
FIGS. 7A, 7B and 7C are diagrams showing an example of the method of displaying the overflow characters in the embodiment.
Figure 7B:
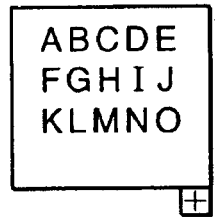
Figure 7C:
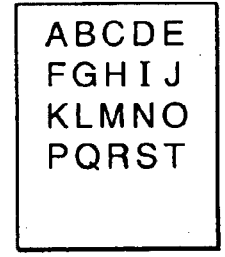

FIGS. 7A to 7C are respectively diagrams showing picture examples when the area having the character overflow and the area having no character overflow are displayed on the CRT 1 of the apparatus according to the present embodiment.

FIG. 7A shows the displayed picture in the state in which there is no character overflow. In this case, the character line ("ABCDE") is arranged and displayed in the rectangular area.

FIG. 7B shows the displayed picture of the area in which the overflow characters are present. In this case, while the character line ("ABCDEFGHIJKLMNOPQRST") is arranged and displayed in the rectangular area, only up to the character data "ABCDEFGHIJKLMNO" is displayed, and the character data "PQRST" which is to be essentially arranged in this rectangular area is not displayed. In addition, the mark "+" exhibiting that there are the overflow characters is displayed in the bottom right of the rectangular area. FIG. 7C shows the state in which an operator carries out the edition manipulation of enlarging that area to change the size of that area so that all of the characters including the overflow characters are displayed.

Figure 9:
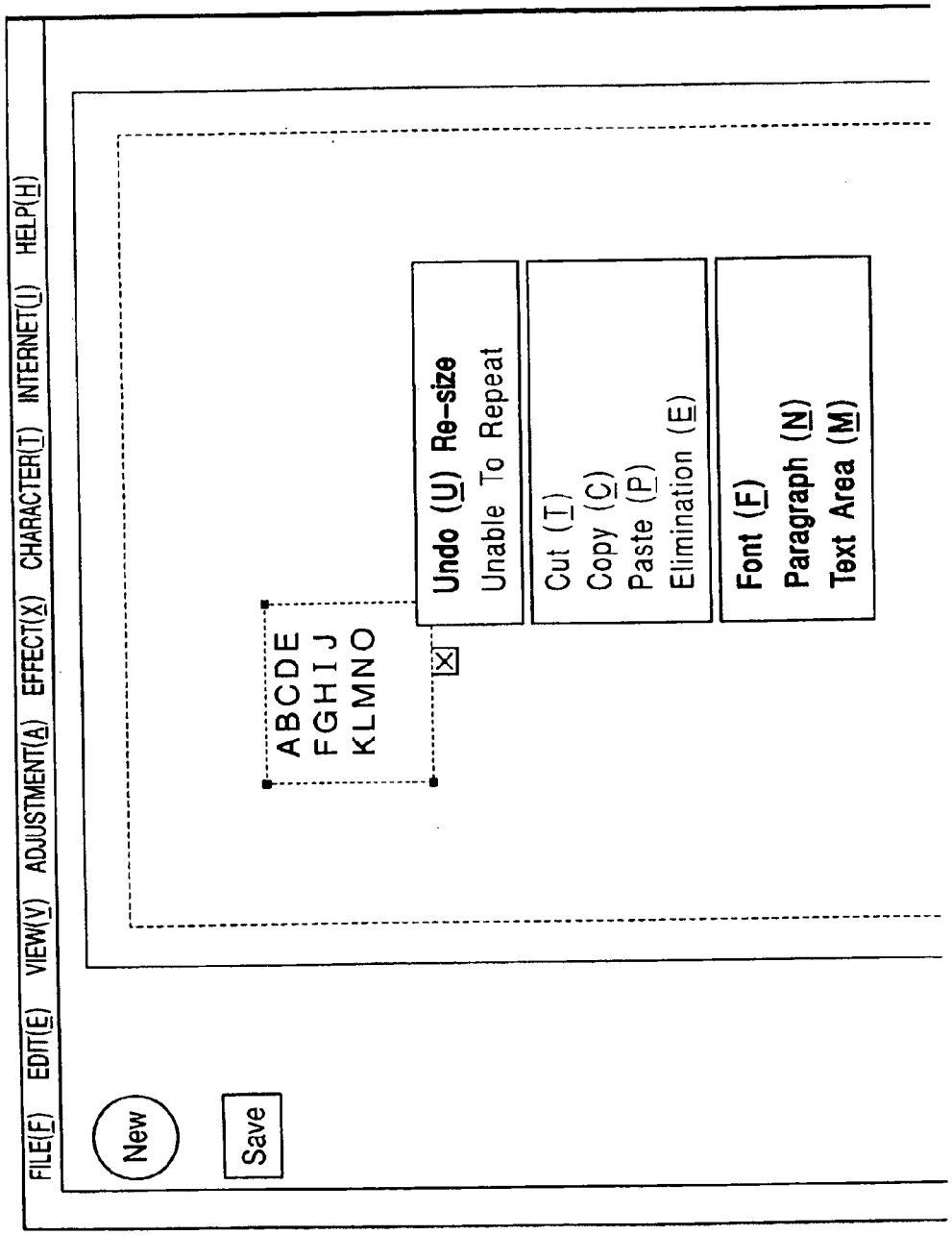
FIG. 9 is a diagram showing a display example of the overflow characters, and the method of moving the overflow characters in the embodiment.

FIGS. 8 and 9 are respectively diagrams showing the picture examples each useful in explaining the manipulation method when moving the character line overflowing from the area.

First of all, in FIG. 8, there is shown the example in which the area (801) and the character line (802) are both displayed in the state in which there is no character overflow as shown in FIG. 7A. In this case, even when the pointer is moved within the rectangular area containing therein the characters and then the right-hand side button of the mouse is clicked to display a pop up menu (803) for that area, it is discriminated that no overflow character is present in that area on the basis of the judgement that the variable (ret) of the area displayed in the cursor position when the mouse is clicked is read out so that zero is set to the variable (ret). Therefore, the sixth item from the top of the menu items, i.e., "Elimination of Overflow Character Line" is set as the unselectable function and this function is displayed, which is different in form from any of other selectable functions as shown in FIG. 8 so as to be able to discriminate that effect.

On the other hand, in FIG. 9, there is shown the example in which the area from which the character overflow as shown in FIG. 7B is displayed. In this case, when the pointer is moved within the rectangular area containing therein the characters and then the right-hand side button of the mouse is clicked to display the pop up menu for that area, on the basis of the judgement that 1 is set to the variable (ret) of that area, it is discriminated that the overflow characters are present in that area, and also the sixth item from the top of the menu items, i.e., "Elimination of Overflow Character Line" is set as the selectable function. If this item is selected, in actual, the elimination of the overflow character line "PQRST" is executed so that the overflow characters "PQRST" will be moved to another area. When being intended to move the character line, the character data ranging from the character data next to the final character data of the final line which was obtained in Step S602 up to the final character data which is stored in the character data information 2i of that area is read out to be moved.

FIG. 10 is a diagram showing the change in the data stored in the RAM 8 when moving the character line overflowing from the area in the present embodiment.

By executing the elimination from the information before executing the elimination, the character data "PQRST" which was not displayed in the area is moved to a new storage area (refer to a part (C) of FIG. 10).

The character line "PQRST" thus moved can be inserted into an arbitrary position within the character data which is set in an arbitrary character area.

Alternatively, after having enlarged the size of the original area from which the character line has been moved, the character line "PQRST" can also be reinserted into the original positions.

Figure 11:
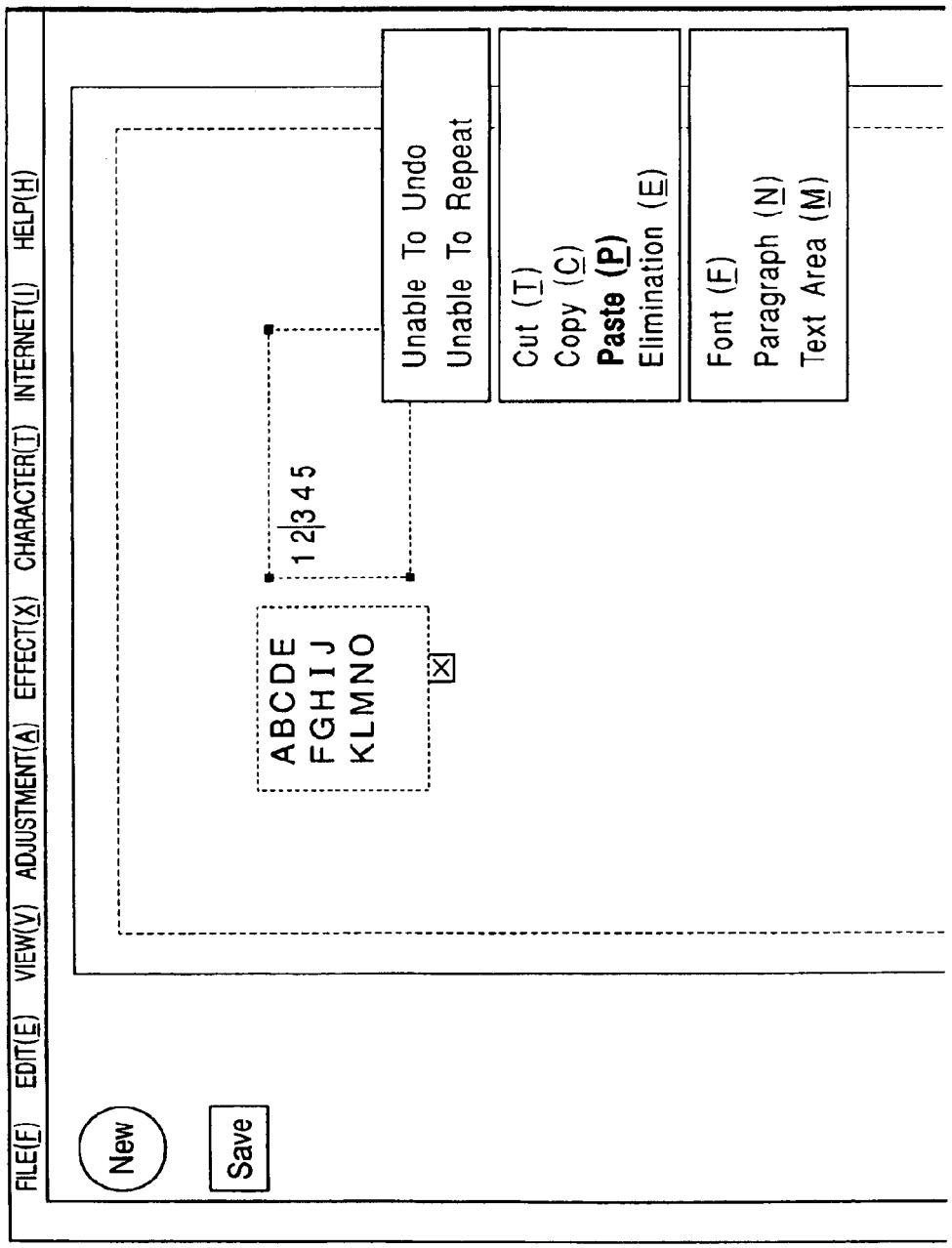
FIG. 11 is a diagram showing the method of inserting the moved character data into another area in the embodiment.

FIG. 11 is a diagram showing an example when the moved character data is inserted into another character data area in the present embodiment. At the time when the pointer is moved to the area on the CRT 1 in which the character line "12345" is displayed, and then the character cursor is made indicate the position between "2" and "3" of the character line "12345" to click the right-hand side button of the mouse, the pop up menu is displayed. Then, the fifth item "Paste" of the menu items is selected, whereby the moved character line "PQRST" which has been cut can be inserted into the position of the character cursor which has been indicated. At this time, as shown in FIG. 12, the character data within the stored data is changed from "12345" to "12PQRST345".

In the case where the range of the character line within the character area is specified, the character line which has not been inserted, but has been moved may be replaced with the character line the range of which has been specified.

In is to be noted that if the manipulation shown in FIG. 11 is not carried out at all, then the character data overflowing from the area is left deleted from the document. Then, if the power source is turned OFF, the overflow character data which is stored in the RAM 8 until then will be erased. It is to be understood that before turning OFF the power source, the overflow character may be stored from the RAM 8 to the HDD 9 or to the FDD 10 to be retained therein.

By executing the above-mentioned processings, carrying out the judgement and the movement processing for the character data overflowing from the area becomes possible.

As set forth hereinabove, according to the present invention, an operator can visually judge whether or not there is characters which are not arranged in an arbitrary character area in the document to overflow therefrom, and also can delete the character line of interest or can move it to another area by the simple operation. As a result, there is obtained the effect that an operator can edit the character line overflowing from the area by the simple operation without wasting carelessly the document memory.

While the present invention has been particularly shown and described with reference to the preferred embodiment and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A character processing apparatus comprising:

first storage means for storing a plurality of character data in association with a plurality of display areas, each for displaying respective character data;

arrangement means for arranging each of the character data stored in said first storage means in a respective one of the plurality of display areas;

display means for displaying each of the character data which can be arranged in the respective display area by said arrangement means, wherein overflow character data which cannot be arranged in the respective display area by said arrangement means is not displayed by said display means;

selection means for selecting the display area in which overflow character data is present;

moving means for moving the overflow character data which cannot be displayed in the display area selected by said selection means to second storage means for storing overflow character data from said first storage means;

specifying means for specifying an arbitrary position in an arbitrary one of the plurality of display areas; and rearrangement means for rearranging the overflow character data stored in said second storage means at the arbitrary position in the arbitrary display area specified by said specifying means.

2. A character processing apparatus according to claim 1, wherein when overflow character data which cannot be displayed in the display area exists, said display means displays a mark to report that the non-displayed overflow character data exists.

3. A character processing apparatus according to claim 1, wherein said display means displays the character data arranged in the display area and a frame representing the display area.

4. A character processing apparatus according to claim 1, wherein said arrangement means arranges the character data in accordance with a format which is decided for every area.

5. A character processing method of controlling a character processing apparatus, the character processing apparatus including first storage means for storing a plurality of character data in association with a plurality of display areas, each for displaying respective character data, said method comprising the steps of:

arranging each of the character data stored in said first storage means in a respective one of the plurality of display areas;

displaying each of the character data which can be arranged in the respective display area in said arranging step, wherein overflow character data which cannot be arranged in the respective display area in said arranging step is not displayed in said displaying step;

selecting the display area in which overflow character data is present;

moving the overflow character data which cannot be displayed in the display area selected in said selecting step to second storage means for storing overflow character data from said first storage means;

specifying an arbitrary position in an arbitrary one of the plurality of display areas; and rearranging the overflow character data stored in said second storage means at the arbitrary position in the arbitrary display area specified in said specifying step.

6. A character processing method according to claim 5, wherein when overflow character data which cannot be displayed in the display area exists, a mark to report that non-displayed overflow character data exists is displayed in said displaying step.

7. A character processing method according to claim 5, wherein said displaying step displays the character data arranged in the display area and a frame representing the display area.

8. A character processing method according to claim 5, wherein the character data is arranged in said arranging step in accordance with a format which is decided for every area.

9. A character processing method, comprising the steps of:
    arranging each of character data, which is stored in storage means in association with a respective one of a plurality of display areas in which the character data is to be displayed, in the respective display area;
    displaying each of the character data which can be arranged in the respective display area in said arranging step, wherein overflow character data which cannot be arranged in the respective display area in said arranging step is not displayed in said displaying step;
    selecting the display area in which overflow character data is present;
    moving the overflow character data which cannot be displayed in the display area selected in said selecting step to second storage means for storing overflow character data from said first storage means;
    specifying an arbitrary position in an arbitrary one of the plurality of display areas; and
    rearranging the overflow character data stored in said second storage means at the arbitrary position in the arbitrary display area specified in said specifying step.

10. A storage medium from which data can be read out by a computer, said storage medium storing therein a control program for executing processing steps comprising:
    arranging each of character data, which is stored in first storage means in association with a respective one of a plurality of display areas in which the character data is to be displayed, in the respective display area;
    displaying each of the character data which can be arranged in the respective display area in said arranging step, wherein overflow character data which cannot be arranged in the respective display area in said arranging step of arranging the character data is not displayed in said displaying step;
    selecting the display area in which overflow character data is present;
    moving the overflow character data which cannot be displayed in the display area selected in said selecting step to second storage means for storing overflow character data from said first storage means;
    specifying an arbitrary position in an arbitrary one of the plurality of display areas; and
    rearranging the overflow character data stored in said second storage means at the arbitrary position in the arbitrary display area specified in said specifying step.

11. A storage medium according to claim 10, wherein when overflow character data which cannot be arranged in the display area exists, a mark to report that the non-displayed overflow character data exists is displayed in said displaying step.

12. A storage medium according to claim 10, wherein said control program for displaying displays character data which is arranged in the area and a frame representing the area.

13. A storage medium according to claim 10 wherein said control program for arranging arranges the character data in accordance with a format which is decided for every area.

* * * * *

UNITED STATES PATENT AND TRADEMARK OFFICE
CERTIFICATE OF CORRECTION

PATENT NO. : 6,879,736 B1
DATED : April 12, 2005
INVENTOR(S) : Satomi

It is certified that error appears in the above-identified patent and that said Letters Patent is hereby corrected as shown below:

Column 1,
Line 37, "is" should read -- are --.

Column 2,
Line 6, "of" should be deleted;
Line 26, "to be" should be deleted;
Line 38, "can" should read -- can- --; and
Line 39, "hot" should read -- not --.

Column 3,
Line 44, "therein them." should read -- them therein. --.

Column 4,
Line 61, "are" should read -- area --.

Column 7,
Line 48, "is" should read -- are --.

Column 8,
Lines 5 and 15, "is" (second occurrence) should read -- are --.

Column 9,
Line 5, "actual," should read -- actuality, --;
Line 32, "indicate" should read -- to indicate --;
Line 45, "In" should read -- It --; and
Line 58, "is" should read -- are --.

Signed and Sealed this

Seventh Day of February, 2006

JON W. DUDAS
*Director of the United States Patent and Trademark Office*